(12) United States Patent
Bryce

(10) Patent No.: US 11,334,089 B1
(45) Date of Patent: May 17, 2022

(54) INFRASTRUCTURE MARKERS FOR AUTONOMOUS VEHICLES

(71) Applicant: Jeffrey W. Bryce, Albuquerque, NM (US)

(72) Inventor: Jeffrey W. Bryce, Albuquerque, NM (US)

(*) Notice: Subject to any disclaimer, the term of this patent is extended or adjusted under 35 U.S.C. 154(b) by 2 days.

(21) Appl. No.: 16/939,859

(22) Filed: Jul. 27, 2020

Related U.S. Application Data

(60) Provisional application No. 62/922,189, filed on Jul. 26, 2019.

(51) Int. Cl.
*G05D 1/02* (2020.01)
*G02B 5/136* (2006.01)

(52) U.S. Cl.
CPC .............. *G05D 1/028* (2013.01); *G02B 5/136* (2013.01); *G05D 1/0234* (2013.01); *G05D 1/0244* (2013.01)

(58) Field of Classification Search
CPC .... G05D 1/028; G05D 1/0234; G05D 1/0244; G01S 13/91; G02B 5/12; G02B 5/136
See application file for complete search history.

(56) References Cited

U.S. PATENT DOCUMENTS

| | | | |
|---|---|---|---|
| 6,194,486 B1 | 2/2001 | Yujiri et al. | |
| 7,034,698 B2 | 4/2006 | Matsumoto et al. | |
| 7,109,850 B2 | 9/2006 | Kawazoe et al. | |
| 7,202,776 B2 | 4/2007 | Breed | |
| 7,660,669 B2 | 2/2010 | Tsuda | |
| 9,056,395 B1 | 6/2015 | Ferguson et al. | |
| 9,097,800 B1 | 8/2015 | Zhu | |
| 9,110,169 B2 | 8/2015 | Stettner et al. | |
| 9,834,209 B2 | 12/2017 | Stettner et al. | |
| 10,145,993 B1* | 12/2018 | Hadi | G08G 1/09 |
| 10,358,057 B2 | 7/2019 | Breed | |

(Continued)

FOREIGN PATENT DOCUMENTS

| | | |
|---|---|---|
| CN | 108352111 A | 7/2018 |
| JP | 2005313880 A | 11/2005 |

(Continued)

OTHER PUBLICATIONS

Hallmark, Shauna, "Preparing Local Agencies for the Future of Connected and Autonomous Vehicles", Final Report 2019-18, Minnesota Department of Transportation, May 2019.

*Primary Examiner* — Aaron L Troost
(74) *Attorney, Agent, or Firm* — Peacock Law P. C.; Justin R. Jackson

(57) ABSTRACT

Markers and a system for use for autonomous vehicles which can help autonomous vehicles to be aware of their surroundings and/or their spatial location. Such markers can include metallic signage having one or more openings and which can include a front that is spaced a distance from a backing plate. The markers can also include patterns that are stamped, cut or otherwise formed in or on a roadway. When a vehicle traverses over the patterns, a sensor, which can include a sound sensor, can detect the sound or vibration produced by the pattern. Once the pattern is detected, the autonomous vehicle can access a database or other repository of patterns (including but not limited to internal memory) and thus obtain information about the location that the vehicle is traversing.

16 Claims, 16 Drawing Sheets

(56) References Cited

U.S. PATENT DOCUMENTS

| | | |
|---|---|---|
| 10,633,027 B2 | 4/2020 | Rowell |
| 2012/0197519 A1 | 8/2012 | Richardson |
| 2013/0039700 A1* | 2/2013 | Philip ..................... E01F 9/608 |
| | | 404/14 |
| 2016/0132705 A1 | 5/2016 | Kovarik et al. |
| 2016/0340843 A1 | 11/2016 | Laclef et al. |
| 2018/0081094 A1 | 3/2018 | Aikin et al. |
| 2018/0164439 A1 | 6/2018 | Droz et al. |
| 2018/0284246 A1 | 10/2018 | Lachapelle |
| 2019/0017235 A1* | 1/2019 | Snead ..................... G02B 5/12 |
| 2019/0250269 A1* | 8/2019 | Miu ..................... G01S 13/931 |
| 2019/0250629 A1 | 8/2019 | Mizuno et al. |
| 2019/0382969 A1 | 12/2019 | McDeid et al. |

FOREIGN PATENT DOCUMENTS

| | | |
|---|---|---|
| JP | 3979382 B2 | 9/2007 |
| JP | 4181138 B2 | 11/2008 |
| JP | 2013503275 A | 5/2014 |
| KR | 20110085711 A | 7/2011 |
| KR | 20110101394 A | 8/2012 |
| KR | 20170132884 A | 12/2017 |
| WO | 2014071939 A1 | 5/2014 |

\* cited by examiner

INFRASTRUCTURE MARKERS FOR AUTONOMOUS VEHICLES

CROSS-REFERENCE TO RELATED APPLICATIONS

This application claims priority to and the benefit of the filing of U.S. Provisional Patent Application No. 62/922,189, entitled "Infrastructure markers for autonomous vehicles", filed on Jul. 26, 2019 and the specification and claims thereof are incorporated herein by reference.

BACKGROUND OF THE INVENTION

Existing road signs are designed to be human-readable and are not particularly effective for autonomous vehicle systems to obtain information from. Vehicles with partial or fully autonomous driving capabilities benefit from getting feedback from machine-readable roadside signs and machine-readable pavement markings.

Autonomous vehicles can navigate reasonably well in good weather conditions. As weather conditions get bad, darkness falls and if unusual hazards appear on the road, it is important to be able to keep vehicles in their lanes and aware of the known local hazards. If automated navigation becomes overly complicated and there is no obviously good navigating option, the vehicle can optionally slow down and stay within a lane. When there is fog, smoke, dust, heavy rain, heavy snow and/or the road is snow covered, existing road signs can be difficult to observe and/or interpret, thus impeding the ability of the vehicle to travel at speed. There is thus a present need for a system that provides good LIDAR, RADAR, sound and/or Ultrasonic feedback in various weather conditions.

BRIEF SUMMARY OF EMBODIMENTS OF THE PRESENT INVENTION

Embodiments of the present invention relate to an autonomous vehicle marker that includes a front panel, the front panel formed from a material that is at least partially RF reflective or at least partially reflective in the electromagnetic spectrum, a rear panel, the rear panel spaced a predetermined distance behind the front panel, and the autonomous vehicle marker configured to provide a return signature having at least a first reflection component and a second reflection component. The front panel can include at least one opening disposed therein. The autonomous vehicle marker can be configured to provide a return signal having a first reflection component, a second reflection component and an internal reflection component. The rear panel can be larger than the front panel. In one embodiment, at least one side panel can be provided. The rear panel can be formed from a material that reflects RF waves. Optionally, at least one the front panel or the rear panel can be formed from a metal material. At least one intervening panel can optionally be disposed between the front panel and the rear panel. The marker can be configured to return a unique RF signature based on factors of its construction, which can optionally include its physical attributes. The physical attributes can include attributes which impart or alter internal reflections of an RF wave within the autonomous vehicle marker.

The marker can also include one or more structures which at least partially reflect RF waves. The one or more structures can include one or more cylindrical structures. Optionally, the front panel can include a curved shape and the curved shaped can optionally include a convex shape. A cover can optionally be disposed over at least a portion of the marker and advertising can optionally be displayed on the cover.

Embodiments of the present invention also relate to a method for providing navigation aid to an autonomous vehicle which itself includes detecting a pattern of markings formed on a road surface, comparing indicia representing the detected pattern of markings to a plurality of stored indicia representing a plurality of different patterns, returning an indicia best matching the detected pattern, and taking an action based on the returned indicia.

Optionally, detecting a pattern of markings can include detecting with an accelerometer and/or with a microphone. The stored indicia can be stored in a database within the vehicle. Optionally, the stored indicia can be stored on a database not within the vehicle and the indicia representing the detected pattern of markings can be wirelessly transmitted.

Embodiments of the present invention also relate to an autonomous vehicle system having a transceiver capable of emitting a signal and receiving a reflected signature from a marker having a front panel separated a distance from a rear panel such that the reflected signature includes internal reflections that occur within the marker, a processor configured to identify and differentiate a plurality of different signals produced by a plurality of different reflected signatures, a database having information associated with the reflected signature; and a processor, configured to retrieve information from the database that is associated with the reflected signature and initiate a response based thereon. The processor can be configured to update information in a navigation system based on the information retrieved from the database. The processor can be configured to initiate the display of information to a vehicle occupant based on the information retrieved from the database. The processor can be configured to initiate a change in an operating characteristic of an autonomous vehicle based on the information retrieved from the database. In one embodiment, the transceiver can include a LIDAR transceiver, and/or a RADAR transceiver.

Embodiments of the present invention also relate to an autonomous vehicle system that includes one or more sensors configured to detect patterns of vertical displacement markings disposed on a road surface; a processor configured to identify and differentiate a plurality of different signals produced by a plurality of different patterns of vertical displacement markings disposed on a road surface; a database having information associated with each of the plurality of different patterns; and a processor, configured to retrieve information from the database that is associated with the detected patterns of vertical displacement markings and initiate a response based thereto.

The processor can be configured to update information in a navigation system based on the information retrieved from the database. The processor can be configured to initiate the display of information to a vehicle occupant based on the information retrieved from the database. The processor can be configured to initiate a change in an operating characteristic of an autonomous vehicle based on the information retrieved from the database.

Embodiments of the present invention also relate to an autonomous vehicle system that includes a transceiver capable of emitting a signal and receiving a reflected signature from a marker having a front panel separated a distance from a rear panel such that the reflected signature includes internal reflections that occur within the marker; one or more sensors configured to detect patterns of vertical displacement markings disposed on a road surface; a processor configured to identify and differentiate a plurality of different signals produced by a plurality of different reflected signatures and to identify and differentiate a plurality of different signals produced by a plurality of different patterns of vertical displacement markings disposed on a road surface; a database having information associated with the reflected signature and including information associated with each of the plurality of different patterns; and a processor, configured to retrieve information from the database that is associated with the reflected signature and initiate a response based thereon and the processor configured to retrieve information from the database that is associated with the detected patterns of vertical displacement markings and initiate a response based thereto.

Markers, which can include but are not limited to reflective markers, which themselves can include infrastructure markers, can be formed to have a three-dimensional shape and can include one or more openings so that LIDAR or other sensors will see a unique pattern and varying distance measurements. The use of openings provides discrimination from the distance to the marker and a longer distance that is found through the one or more openings. Sensor systems receive the reflected waves back and can identify the marker while obtaining distance information to the sign and/or between the front and rear portions of a marker. The vehicle can thus determine the distance to the marker and by taking readings over time as the vehicle passes. Thus, the vehicle can confirm its distance from the marker and if the location of the marker is known, the vehicle can thus determine its location on the road.

Optionally, markers can be provided without an opening on a front panel so long as at least a portion of a wave or signal, which can optionally be attenuated by passing through one or more partially transparent portions, is able to be reflected at least a portion of a rear panel. This enables a signature to be formed having at least two peaks (the front panel and the front panel) and the two peaks can be separated by distance that is proportional to the distance between the at least two panels, which can enable a sensor/transceiver to provide high discrimination when the system is configured to detect for peaks separated by that known distance.

Markers can include not only reflective markers disposed alongside a road but also patterns in the pavement which can be detected by vibration sensors, accelerometers, audio sensors or other sensors as the vehicle's tires come in contact with the modified pavement, thus creating sound and/or imparting vibration or other motion to the vehicle.

In one embodiment, markers can optionally not be reflective markers but can instead be pavement markers, which can include cuts and/or ridges formed in or on the pavement or other road surface. Pavement markers can go across the road, parallel with the road, diagonal to the road or in any other orientation, location, or configuration with respect to a road. Optionally, pavement markers can be stamped into or added onto a road or formed in another manner such that tires of a vehicle traveling over the pavement marker creates a signal.

In one embodiment, reflective markers can be formed having a three dimensional shape and can have a front panel with one or more openings disposed therein, a rear panel that is most preferably larger than the front panel and/or be partially radio frequency ("RF") transparent so that RADAR, LIDAR and/or other sensors can see a unique pattern and can obtain distance measurements to the marker. Optionally, however, the front panel can be as large as or larger than the rear panel. In one embodiment, one or both of the front and/or rear panels can be formed from a partially RF transparent material and/or can be formed from a material that is not RF transparent. Vehicle sensor systems preferably receive the reflected waves back from a marker with the unique signature to confirm that the target is a reflective marker that is linked to the mapping system and not some other similar artifact in or near a roadway. The vehicle can obtain distance data to the marker—for example by measuring time-of-flight for the radio wave, ultrasonic wave, and/or laser beam to travel to and bounce back from the marker and/or by taking readings over time and can preferably confirm its position in the mapping system and location of the vehicle in the road.

Optionally, markers can be formed from a single plate with an opening formed in it. This single-plate marker is still effective for LIDAR, but does not provide as good of a signature for lower frequency sensors. A marker can be formed from a plurality of panels with no openings provided in any of them. Such a marker can provide a unique signature due to waves coming in the sides but can be even more useful if the front panel(s) are at least partially RF transparent. In one embodiment, a front panel with an opening in it can be disposed in front of a rear panel and the rear panel is preferably disposed behind the opening of the front panel. Optionally, a front panel can be provided without an opening in it. In this embodiment, the rear panel is preferably larger than the front panel or is otherwise offset from the front panel so that both the front and a portion of the rear panel are visible to a transceiver of a vehicle. Optionally, the front panel can be partially RF transparent so that a portion of an incoming RF wave passes through it and reflects back out through it after being reflected from the rear panel—this can include use for RADAR markers.

By providing a marker having a front panel with an opening and a rear panel spaced a distance from the front panel, this configuration thus provides two surfaces at different distances from a vehicle which provides the ability for the front surface to have a unique signature in combination with a return signal from the rear panel so that the relationship between the two surfaces can provide a unique signature.

In one embodiment, LIDAR and/or other transceiver types can scan by sending out signals that bounce back such that the time of travel shows at what distance the reflecting object is. Phase change can also be used to determine the signature of a marker. The shape and construction of the marker can provide a unique return signature that can be mapped or otherwise associated with GPS data and its relative position to features of a road. Such markers allow a vehicle to have absolute positioning that is more accurate than GPS and which keeps vehicles on the road and in their lanes even at night and when weather conditions impair visibility.

Vehicle sensor configurations can be varied and markers can be optimized to have best functionality for the sensor type and the sensor viewing area. If 360 degree scanners/transceivers are used, the markers can optimally be fabricated and positioned to maximize reflection back to a far approaching vehicle that has a small angle relative to the marker's location off the edge of the road. Data is preferably gathered from a distance and as the vehicle approaches, passes and drives away from the sign, a maximum amount of data can be gathered. This can be enhanced by having a curved marker which can include one or more structures, which themselves can optionally be curved.

If a scanner is a forward looking 120 degree scanner, then the marker can be angled back to create the best angles of incidence to get data from afar and continue to gather data until the forward looking scan is in front of the marker. In one embodiment, long range marker can be formed to have a curved or angular shape which maximize reflection back to a vehicle that is far away which itself can have a small angle relative to the marker's location off the edge of the road. If 360 degree scanners/transceivers are used, the markers can optionally be fabricated and positioned to be seen by an approaching vehicle and the vehicle after it passes the marker and is driving away. Such, markers can be optionally be enhanced by having one or more curved or angled panels or multi-sided panels.

In summary, the marker orientation relative to the road, curvature, pattern, and structure of the marker can be varied to provide the unique return signatures and redundant data over time for the vehicle to recognize that this is a marker and best measure the location of the vehicle relative to the marker and/or to features of the road.

As a vehicle sensor—for example a LIDAR 360 degree scanner, spins around, it gathers thousands of reflected points per second. This maps the area in a horizontal ring and the vehicle learns where objects are. As multiple scanners are used, or with the aid of a movable mirror or other device which imparts rotational or angular movement of the scanner, the rings of data points are stacked up and the combined images show what objects are all the way around the vehicle from the ground up towards the horizon.

Some of these scanners can differentiate distances all the way down to a millimeter, so when markers have depth to them or openings disposed in them, the reflected points provide data to show an image of the sign, thus producing a signature that the vehicle computer compares to a standard image or group of standard images (which can include a sign recognition algorithm) to confirm that the returned signal is coming from a marker. These markers can be optimized to be machine readable by an autonomous vehicle system.

Embodiments of the present invention can provide:
 a unique RADAR signature such that the marker can have two or more panels that are visible to incoming radar and reflect waves back towards the emitting vehicle to provide a unique RADAR signature;
 a unique LIDAR signature such that the marker can have two or more panels that are visible to incoming LIDAR and reflect waves back towards the emitting vehicle to provide a unique LIDAR signature; and/or
 a unique Ultrasonic signature such that the marker can have two or more panels that are visible to incoming Ultrasonic waves and reflect waves back towards the emitting vehicle to provide a unique Ultrasonic signature.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings.

DETAILED DESCRIPTION OF THE INVENTION

Figure 1:
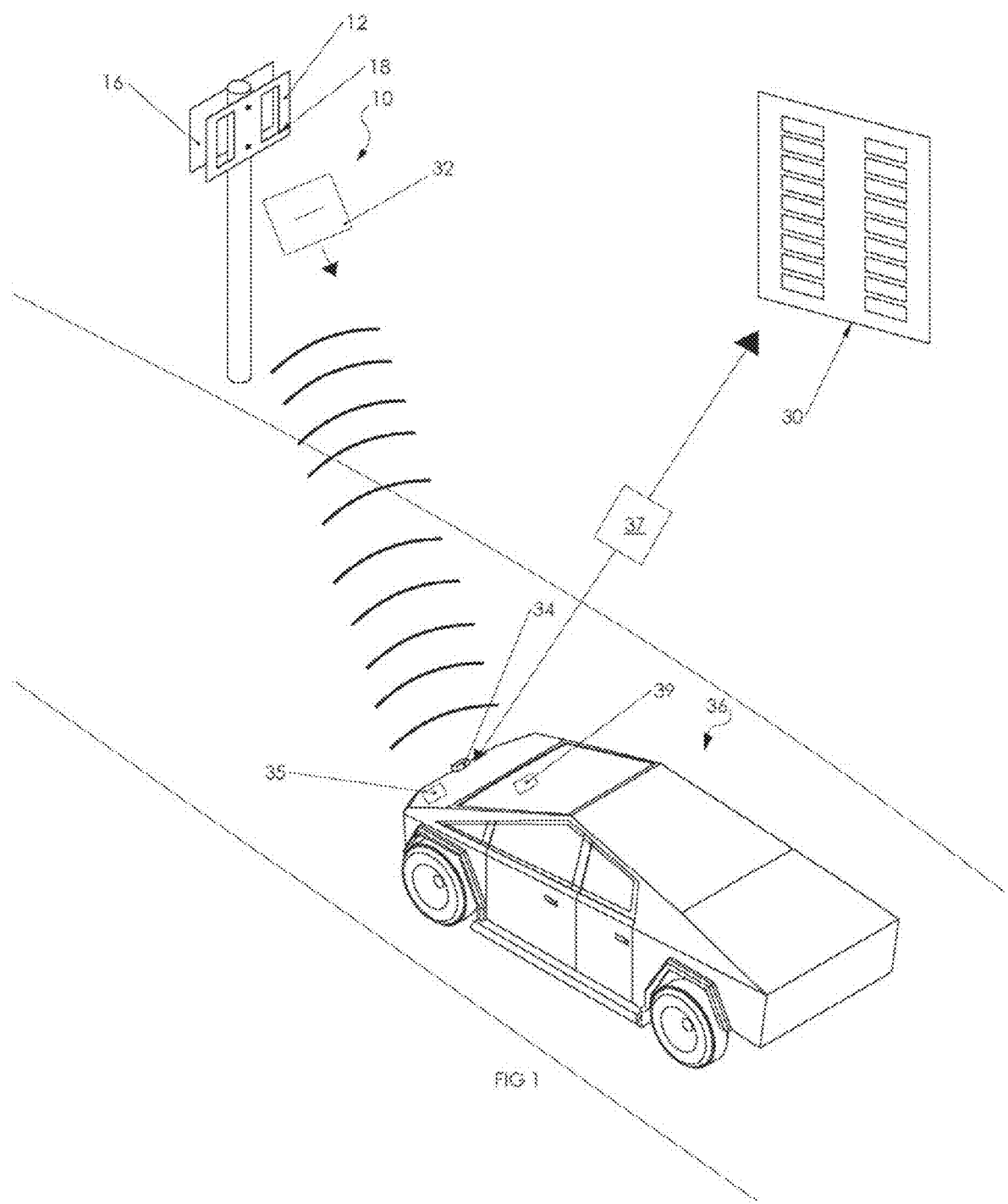
FIG. 1 is a perspective view of an embodiment of the present invention which illustrates a vehicle obtaining a unique signature from a marker and retrieving information from a database.
Figure 2:
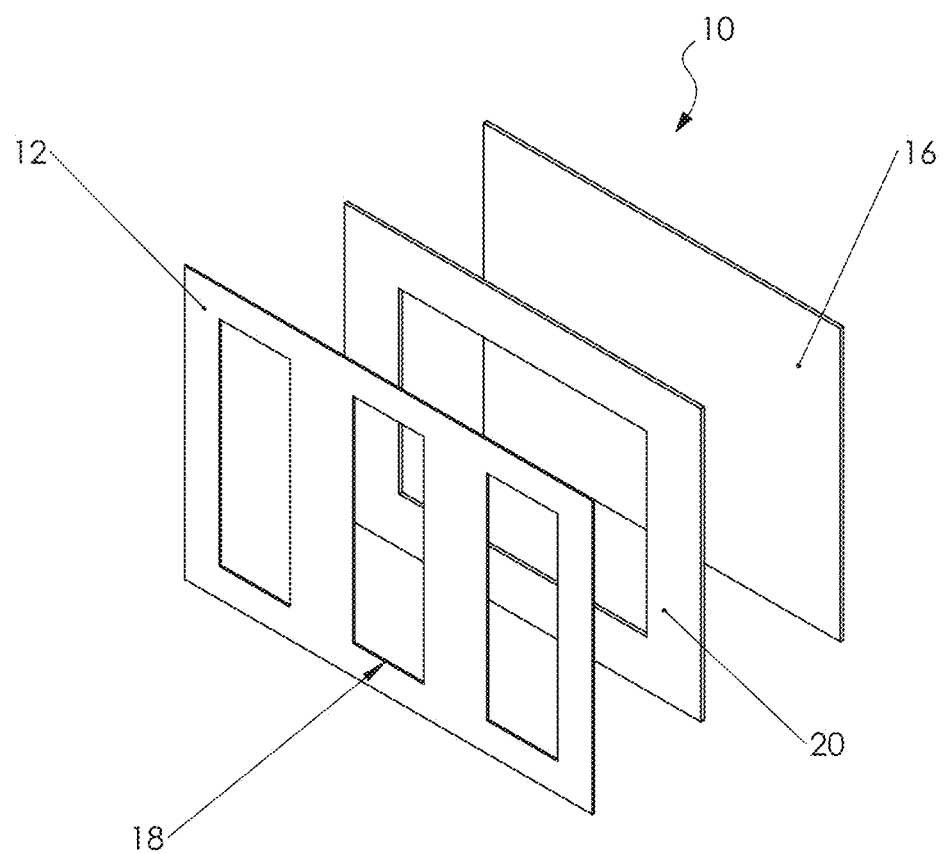
FIG. 2 is a drawing which illustrates an embodiment of a marker having an intervening panel.
Figure 3:
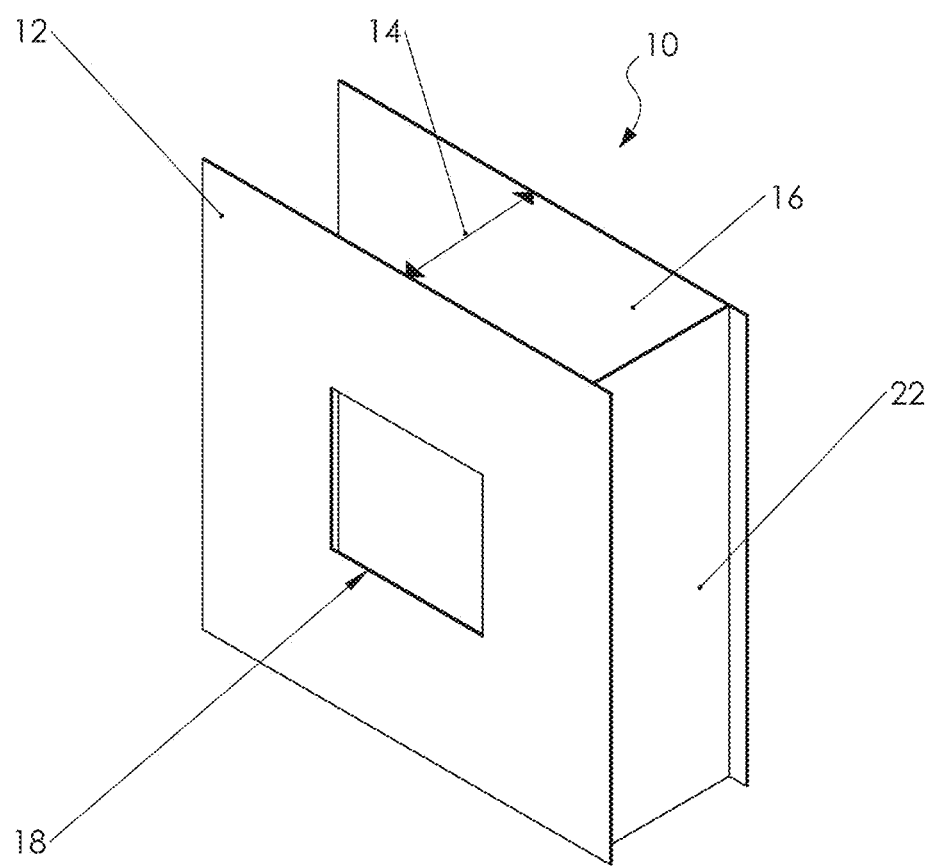
FIG. 3 is a drawing which illustrates an embodiment of a marker with a side panel.
Figure 4:
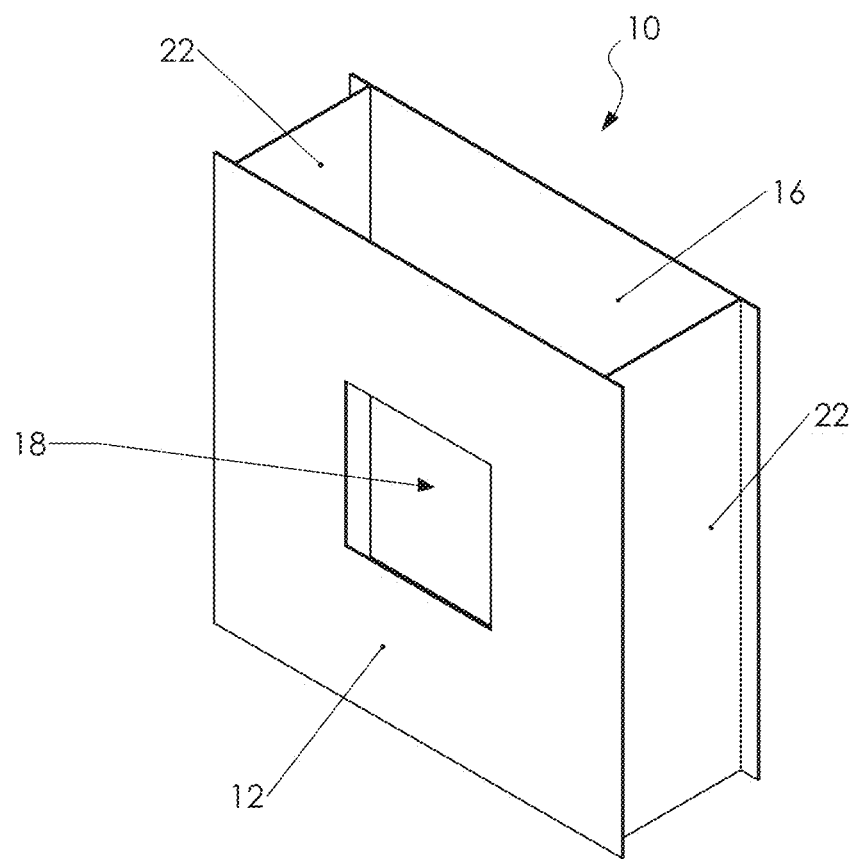
FIG. 4 is a drawing which illustrates a perspective view of a marker with two side panels.

Embodiments of the present relate to markers which can reflect electromagnetic and/or acoustic waves and/or vibratory energy with unique signatures so that sensors can differentiate between markers and other objects in or near roads, as well as the use of such markers.

Infrastructure markers and other signs or identifying indicia ("IM"), hereinafter also generally referred to as a "marker" or "markers," are preferably configured to give unique RADAR, LIDAR and ultrasonic signatures and/or be recognizable by camera systems. Vehicles can use one, two, three or all four of these sensor types. For vehicles with three or four sensor types, the precise location of the marker can be determined by looking up its signature in a database, and the vehicle can get information of its location by measuring the distance and position to the marker via time of flight of the sensing signal. If the vehicle is moving fast and weather conditions are good, then it is likely that the LIDAR feedback will prove the best data and be heavily weighted in confirming location. If the vehicle is in a parking lot and in close proximity to a sign, then the ultrasonic feedback may provide the best data. If weather conditions are adverse such as in the snow, rain, fog, smoke, dust, darkness and more, then the RADAR can see when the other sensors may not be able to. In addition to edge of pavement and lane location information, any other desired type of information can be associated with a marker, including but not limited to construction workers present, mowing crew in the area, trash pickup crew in the area, intersections, merge lanes, on and off ramps, combinations thereof, and the like. In addition, markers can be installed on other vehicles and can thus be used to identify emergency response vehicles and/or provide any local hazard information.

Markers can be passive, such that they do not themselves require power to operate. In addition to the signs being readable by RADAR, LIDAR, Ultrasonic and camera sensors systems, the signs can vary in design so that some signs can be purely location markers while other signs can notify the vehicle of changing road conditions—these can include, for example, construction, mowing crew, cleanup crew, paving (which can mean that road lines are missing from the surface of the road), accidents and more.

When markers are installed, their position is preferably accurately documented—for example relative to the edge of the pavement, the center of the road, the lane edge marking, or any other reference point. This information is preferably included in mapping systems. Thus, when navigating gets tough due to darkness and/or adverse weather, these markers can provide absolute location information to help cars stay in their proper lanes.

In addition to 360 degree LIDAR, these markers can be configured to work with other LIDAR, RADAR, SONAR, Ultrasonic and/or other sensor systems that autonomous vehicles use now and into the future.

The absolute position of permanent roadside markers can be documented in mapping systems, which mapping systems can be used by vehicles for navigating. Temporary signs, which can include, for example, construction signs, may also be entered into the mapping systems.

In addition to signs on the side of the road, unique pavement markings, which can include, for example, patterns that can be cut, stamped, or otherwise formed into and/or onto the road, can give vibratory and/or acoustic feedback to the vehicle as tires of the vehicle travel across the unique pavement markings so that sensors onboard the vehicle, which sense such vibratory and/or acoustic effects, can be used by the vehicle to know that the vehicle is crossing over such markings. This can be helpful not only for simply ensuring that the vehicle is staying in its lane, but can also be used by the vehicle for lane changes, or other actions as it travels upon, enters, or exits a road and/or as the vehicle pulls onto a shoulder of a road, including as the vehicle approaches the edge of the pavement or a barrier. The unique pavement markings can also provide feedback of where to stop as the vehicle approaches stop lights, stop signs, railroad tracks, cross walks, flood zones, combinations thereof and the like. Accordingly, numerous and diverse patterns can be formed along a single stretch of road to provide a variety of information about numerous locations along the road. The pavement markings can be formed across a road, run parallel with the road, at angles to the length of the road and/or can be at any other desired location, position, and orientation with respect to the road or a portion thereof.

For embodiments of the present invention, in addition to the unique signatures of roadway signs that are machine readable, the signs can also optionally be positioned at precise locations that, after their location and information are integrated into mapping systems, preferably provide information to autonomous vehicles as to the location of any number of diverse items, including but not limited to where the edge of pavement is and/or the location of various lanes of the road. Autonomous vehicles that are programmed to read the IM are better able to stay within their lane and have more data that will allow them to be operated safely.

Referring now to the figures, marker 10 preferably includes front panel 12 separated distance 14 from rear panel 16. Front panel 12 preferably comprises one or more openings 18 disposed therein. In one embodiment, rear panel 16 is most preferably formed from a solid material but can optionally comprise one or more holes. More particularly, one or more intervening panels 20 with openings 18, can optionally be disposed between front panel 12 and rear panel 16. Optionally, one or more side panels 22 can be provided. Sides 22 can include not only vertically-arranged side pieces but can also include top and/or bottom sides. In one embodiment, any number of sides 22 can be provided, including 0, 1, 2, 3, 4, or more (for example for embodiments wherein front and rear panels are octagonal, up to 8 sides can be provided). Thus, in one embodiment, all sides of marker 10 can be enclosed.

Optionally, such side panels can be disposed at any desired angle with respect to the front and/or rear panel. For example, one or more side panels can be positioned at a right angle with respect to front panel 12 (for example to form a cube or box-like structure) or they can be arranged at an angle other than 90 degrees—for example to form a rhombus-like structure, thus altering how internal reflections of a signal occur within marker 10.

By varying the shape, size, and/or number of openings 18, distance 14, intervening panels 20, and/or side panels 22, the reflection signature of marker 10 can be varied to provide an infinite number of unique signatures. This enables markers to be disposed about roadways with a signature that can be unique or which can be identical to another marker 10. For example, a plurality of markers 10, having the same signature can be placed along a roadway and can be used to identify the road name and/or number. Likewise, a plurality of different markers 10 can be disposed along that same stretch of road which markers are placed at known geographic locations and a database 30 can be created which itself comprises a plurality of markers 10 having unique signatures 32 that represent specific geographic locations. Vehicle 36 preferably comprises processor 35 which is capable of processing signature 32 to recognize, retrieve, or otherwise assign unique indicia of signature 32 for example by comparing returned signatures to a set of data that contains known marker signatures. For example, in one embodiment, the output of the sensor portion of transceiver 34 is can be processed by processor 35 to generate a unique number which can then be communicated to database 30 (optionally via communication system 37 for embodiments in which database is remote from vehicle 36) and processor 35 can thus receive the associated data from database 30. Processor 35 can then optionally cause vehicle 36 to take some action and/or processor 35 can cause display 39 to display information to a vehicle occupant. Although processor 35 can be a single unit which performs all the foregoing functions, in one embodiment, processor can comprise a collection of components or assemblies which together perform the foregoing actions. Thus, the term "processor" can include a single unit or a plurality of components.

Because the time-of-flight of a signal (whether acoustic or electromagnetic) can be measured, the distance from marker 10 to transceiver 34 of vehicle 36 can be known. And, because each marker 10 can be placed at a known location, the location of vehicle 36 can thus be determined with precision. For example, as vehicle 36 navigates to a destination, one or more transceivers 34 can emit and detect acoustic and/or electromagnetic waves (including but not limited to ultrasonic waves RADAR, and/or LIDAR). Although transceiver 34 can comprise a single unit that emits a signal and detects a return signal, the term "transceiver" as used throughout this application is intended any combination or collection of components and/or systems which together can emit a signal and sense a returned signal, including but not limited to LIDAR and RADAR scanners. As signals encounter markers 10, its signature 32 is returned to transceivers 34. Such returned signatures can then be compared to known signatures which are stored in database 30. Database 30 can associate signatures 32 with any desired associated data, which can include but is not limited to geographic location (which itself can include but is not limited to GPS coordinates), road names and numbers, mile markers, intersection indicia, changes in road conditions, combinations thereof and the like. Thus, the information retrieved from database 30 can be used to provide information to vehicle 36 to enable it to better understand its precise location and its surroundings.

In one embodiment, marker 10 need not be limited to marking infrastructure or geographic location. Instead, marker 10 can optionally be placed on one or more other vehicles such that a first vehicle can retrieve a signature of a marker of another vehicle and thus obtain information about the other vehicle. For example, marker 10 can be placed on emergency vehicles and database 30 can be used to associate information about the emergency vehicle with signature 32 of marker 10 that is placed on that vehicle.

As best illustrated in the exemplary roadside marker of FIG. 1, high frequency sensors such as LIDAR can give a 2-D image of the front panel and a 2-D image of what is seen of the back panel with distance information, which can optionally include information regarding the distance between the front panel and the rear panel. LIDAR can be operated at a frequency above about 3.000 GHz. Sensors which operate at a frequency below about 3.000 GHz ("lower frequency sensors") can be used and can include, for example, RADAR and ultrasonic preferably give a reflective pattern showing distance and signal strength of the front panel, strength and signal strength of the back panel and the distance between the panels. Lower frequency sensors can also show ghost panel(s) behind the back panel that comes from reflections in between the panels.

In one embodiment, markers can comprise a front panel and a rear panel that are spaced apart from one another. The front panel can include one or more openings such that an electromagnetic wave can pass through the opening, bounce off of the back panel and strike a back portion of the front panel, thus bouncing back-and-forth between the front and rear panel. Thus, the radar reflected waves get trapped within the marker and are internally reflected before escaping to return to the RADAR transceiver in the vehicle. This gives not only a reflection of the front panel (from that portion of the waves that do not pass through the opening in the front panel), and a reflection of the back panel (from that portion of the wave that bounces directly back through the opening in the front panel), but also additional reflections that are formed from the internal reflections between the front and rear panels. These additional reflections can be used to clearly differentiate the location marker from random objects on the side of the road.

Figure 10:
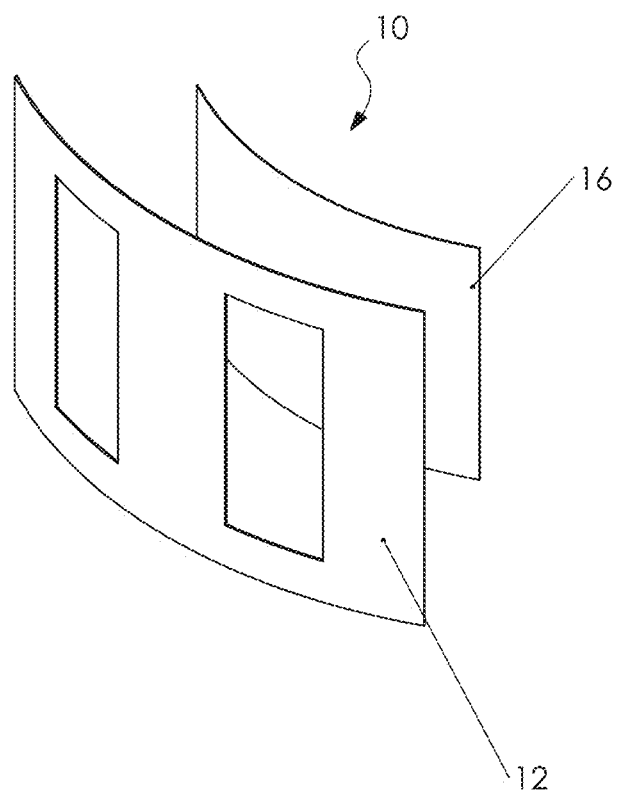
FIG. 10 is a drawing which illustrates a perspective view of a marker having a curved shape
Figure 15:
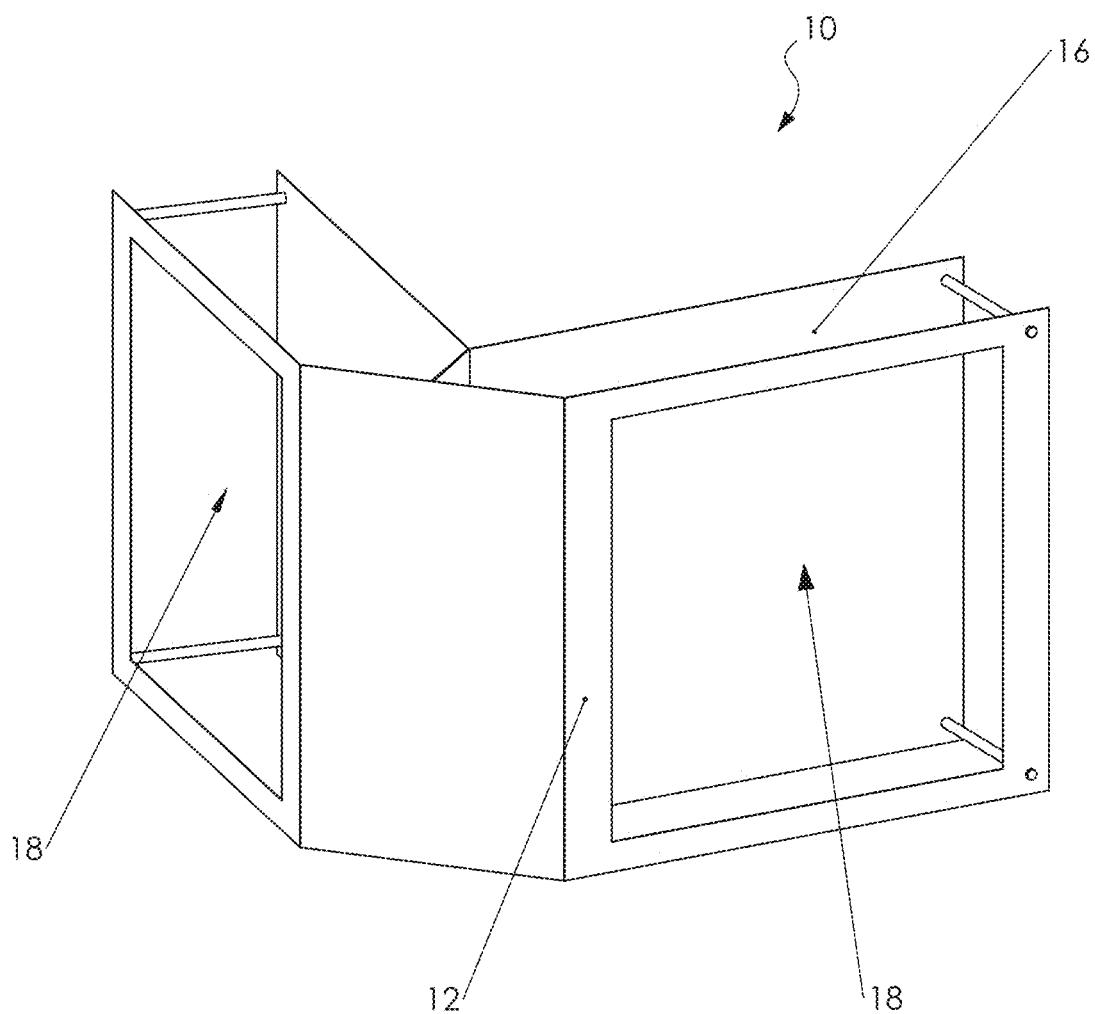
FIG. 15 is a drawing which illustrates a plurality of top views of possible shapes for a marker.

Referring now to FIG. 10, marker 10 can be formed in a curved shape. Optionally, when viewed from in front of front panel 12, front panel 12 can be curved such that it is convex (as illustrated in FIG. 10), or front panel 12 can be curved in a concave shape or any other series of curves and/or angular shapes. Optionally, rear panel 16 can comprise a curve of similar shape and magnitude or back panel 16 can be flat or have some other shape—for example a convex front panel 12 and a concave rear panel 16. Convex shapes can allow a vehicle to see marker 10 over an extended period of time because the vehicle can detect marker 10 from an angle that would otherwise be difficult or impossible to detect if marker 10 were not convex. This enables signature 32 to be received and evaluated for a greater period of time. This can help ensure a proper interpretation of signature 32 which can provide improved vehicle locating accuracy. FIG. 15 illustrates several top views of different shapes that marker 10 can be formed into. The shapes illustrated in FIG. 15 are meant to be merely illustrative of some possibilities of shapes as an almost infinite number of shapes and configurations can be used and will provide desirable results.

Figure 11:
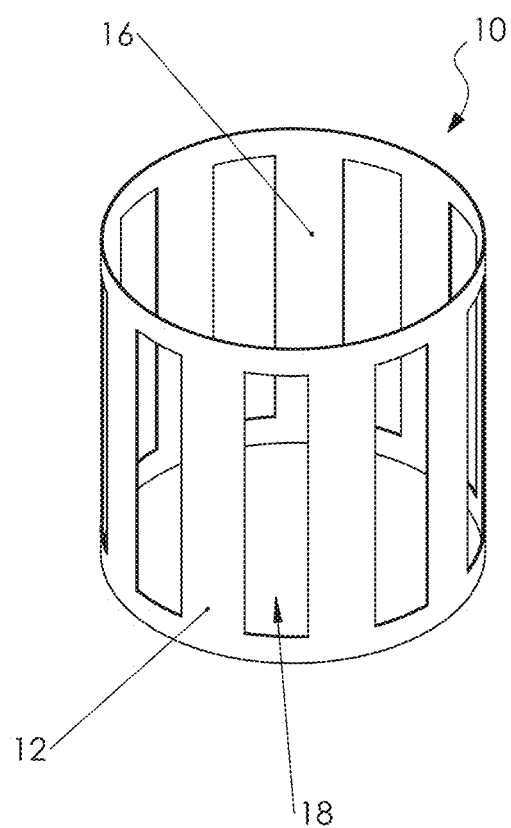
FIG. 11 is a drawing which illustrates a marker which is formed to have a cylindrical shape.

As best illustrated in FIG. 11, marker 10 can be formed into a single continuous shape such that an inner surface of front panel 12 can form rear panel 16. Thus, rear panel 16 need not be a separate panel but can itself be formed from a portion of front panel 12 when front panel 12 is bent or otherwise configured in such a way that a radio wave can travel through an opening in front panel 12 and all or a portion of the radio wave can then be reflected back in the direction from which it was transmitted.

Optionally, marker 10 can be mounted on a pole or poles or can be mounted on another surface, including but not limited to bridges, overpasses, guard rails, buildings, curbs, other road infrastructure items, equipment, other vehicles, combinations thereof and the like. Standoffs can be used to increase the distance between the front panel 12 and rear panel 16 and/or intervening panel 20, or any other surface behind front panel 12. The surface finish and coating on marker 10 can affect how the waves are reflected and can thus be adjusted to provide a desired performance and/or for cost effectiveness.

Marker 10 can be formed in any known manner including but not limited to stamped, pressed, cut for flat and/or curved markers, water, plasma, and/or laser cut, assembled from prefabricated components, including attaching curved tubular pillars to curved or flat panels, or other cutting and/or bending techniques.

Figure 12:
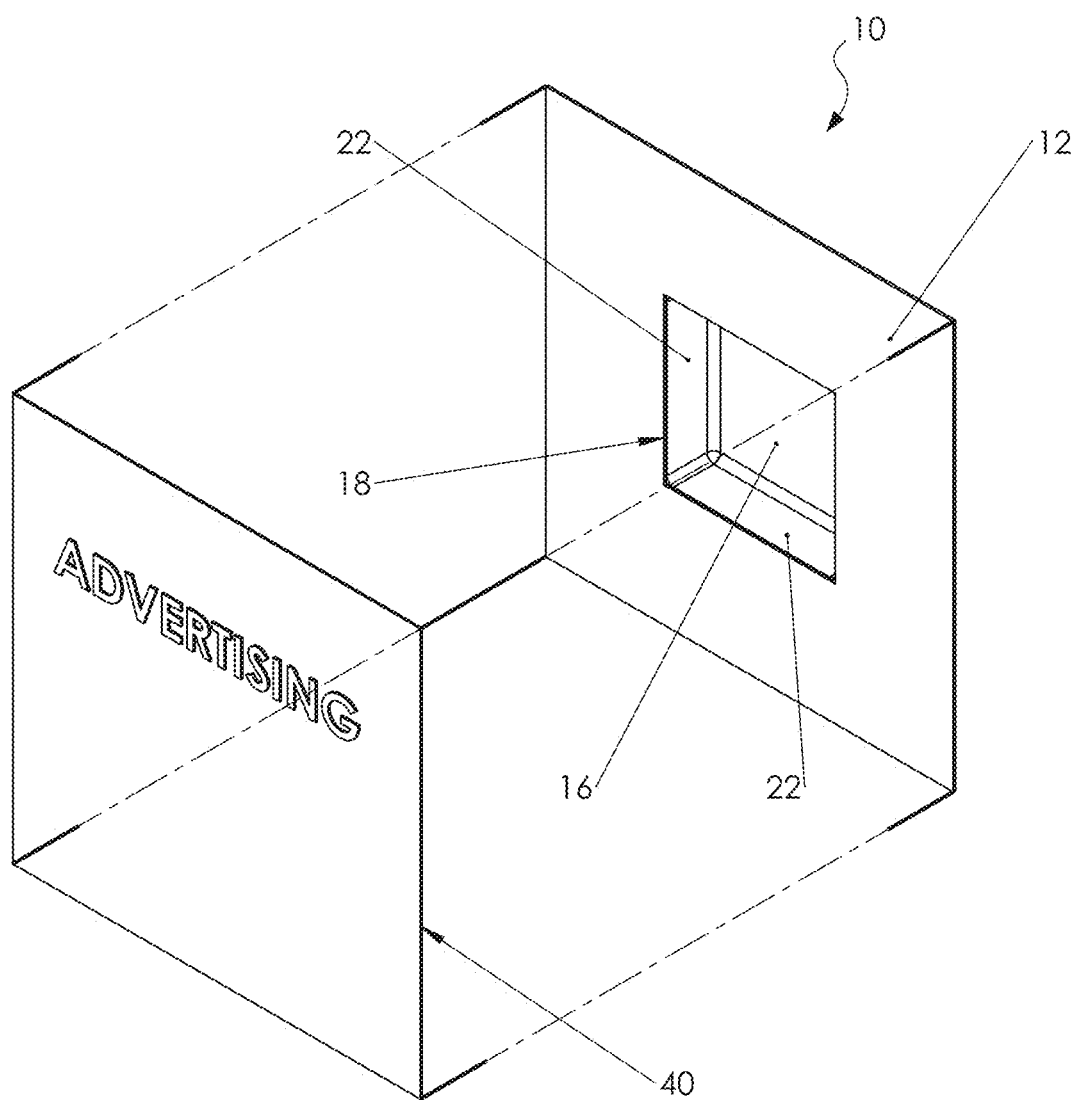
FIG. 12 is a partially-exploded view drawing which illustrates a perspective view of a marker that has been formed by pressing an indentation into a sheet to form a rear panel portion that is recessed from the front panel portion and which includes a cover with advertising.

As best illustrated in FIG. 12, cover 40 can optionally be provided on at least one side of marker 10. Cover 40 is most preferably formed from an RF transparent material and can optionally have advertising disposed thereon. Being RF transparent, the shape and size of cover 40 can be varied to any desired shape and configuration without affecting the RF reflective functionality of marker 10.

Figure 13:
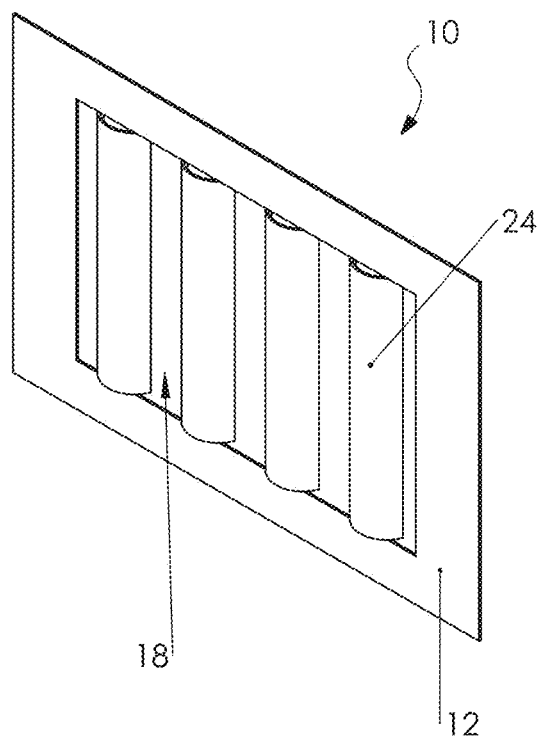
FIG. 13 is a drawing which illustrates an embodiment of a marker having structures disposed therein.

Referring to FIG. 13, in one embodiment, one or more structures 24 can be disposed on or otherwise formed on a portion of marker 10. As a non-limiting example, structures 24 can comprise cylindrical, angular, conical, and/or curved shapes as well as combinations thereof and can be disposed on front panel 12, rear panel 16 and/or intervening panel 20. Structures can be disposed in a portion of opening 18 or in a gap between front and rear panels or an any other portion of marker 10 or a combination of different places on marker 10. Structures 24 can be formed from a RF opaque and/or semi-transparent material such that structures 24 affect and thus alter signature 32 that would otherwise occur without structures 24. For embodiments when structures 24 comprise curved shapes that are disposed on a front portion of marker 10, the use of such curved shapes can allow the vehicle to receive the signature of the marker from a greater angle and thus for a longer time, thereby enabling the system to capture more data and/or more precise data and thus provide a high degree of confidence in the signature of the marker. Thus, in one embodiment, one or more pillars having a circular cross section (360 degrees) can maximize the angles where the vehicle can receive a reflection of the emitted signal.

In one embodiment, transceiver 34 of autonomous vehicle 36 can take multiple distance readings as it approaches marker 10 which can show, for example, the distance from transceiver 34 to marker 10 decreasing, but as vehicle 36 passes marker 10, the measured distances increase. Thus, with the multiple distance measurements, vehicle 36 can determine and/or track its distance from marker 10 as it passes, and vehicle 36 can determine its absolute position and relative location to a point on the road. This can be used to steer vehicle 36 back to the center of its intended lane of travel. Optionally, markers 10 can be formed from any of a variety of materials including but not limited to metal, plastic, wood, composites, other materials, combinations thereof, and the like.

Optionally, signature 32 can be altered from one marker to another by choosing different material thicknesses and materials with varying electromagnetic wave reflective and transmissive properties. Still further, markers 10 can be provided with any of a variety of surface finishes including but not limited to rough, smooth, textured, and any combination thereof. Markers 10 can be uncoated or coated with any desired coating material, including but not limited to paint, powder coating, anodizing, alodining, electroplating, combinations thereof and the like. Optionally, the exterior shape of marker 10 can have any desired shape, including but not limited to rectangular, circular, triangular, 4-sided, multiple sided shapes and shapes having curves and/or irregular shapes and can be made to any desired size.

In one embodiment, marker 10 can be powered and can be configured to emit a desired signature 32. The emission of a desired signature can be continuous, periodic, or can occur in response to some stimulus from an autonomous vehicle system, including but not limited to a powered marker 10 detecting a signal emitted by a portion of autonomous vehicle 36. Optionally, the power for a powered marker 10 can come from a received signal of vehicle 36.

Figure 5:
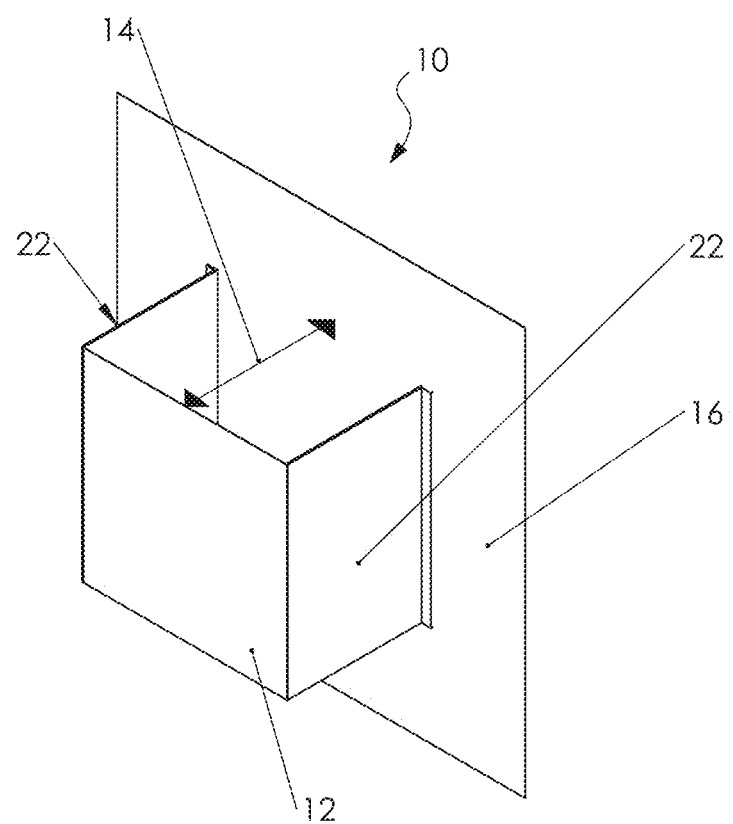
FIG. 5 is a drawing which illustrates a perspective view of a marker with a smaller front panel, with two side panels and a larger rear panel.
Figure 6:
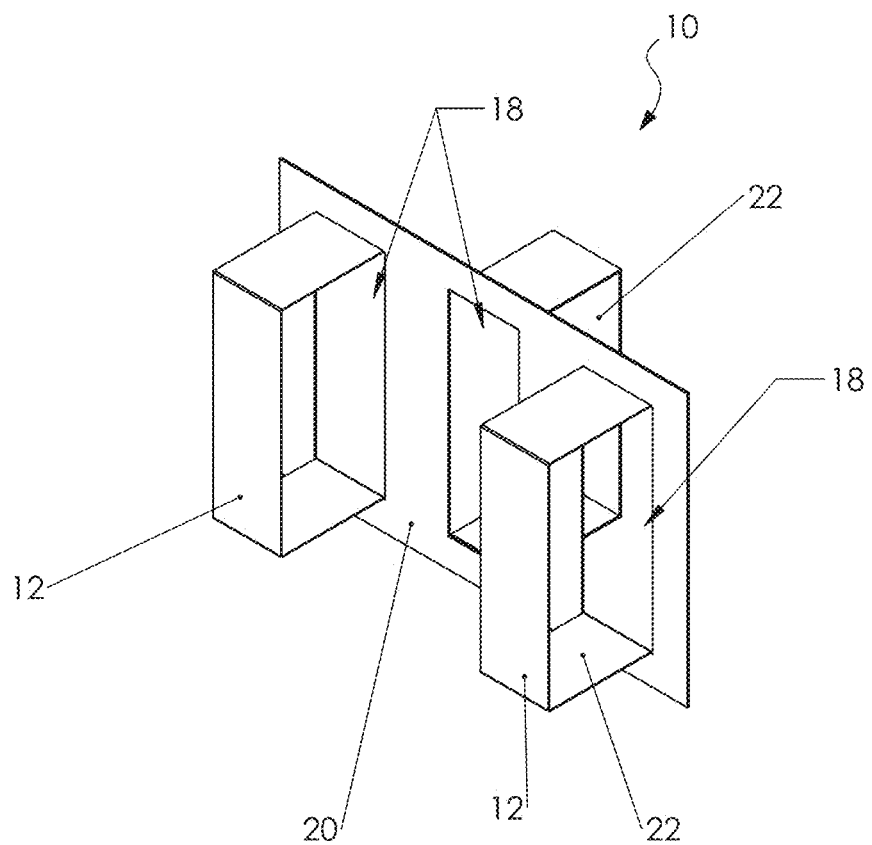
FIG. 6 is a drawing which illustrates a perspective view of a marker with multiple offset panels.
Figure 7:
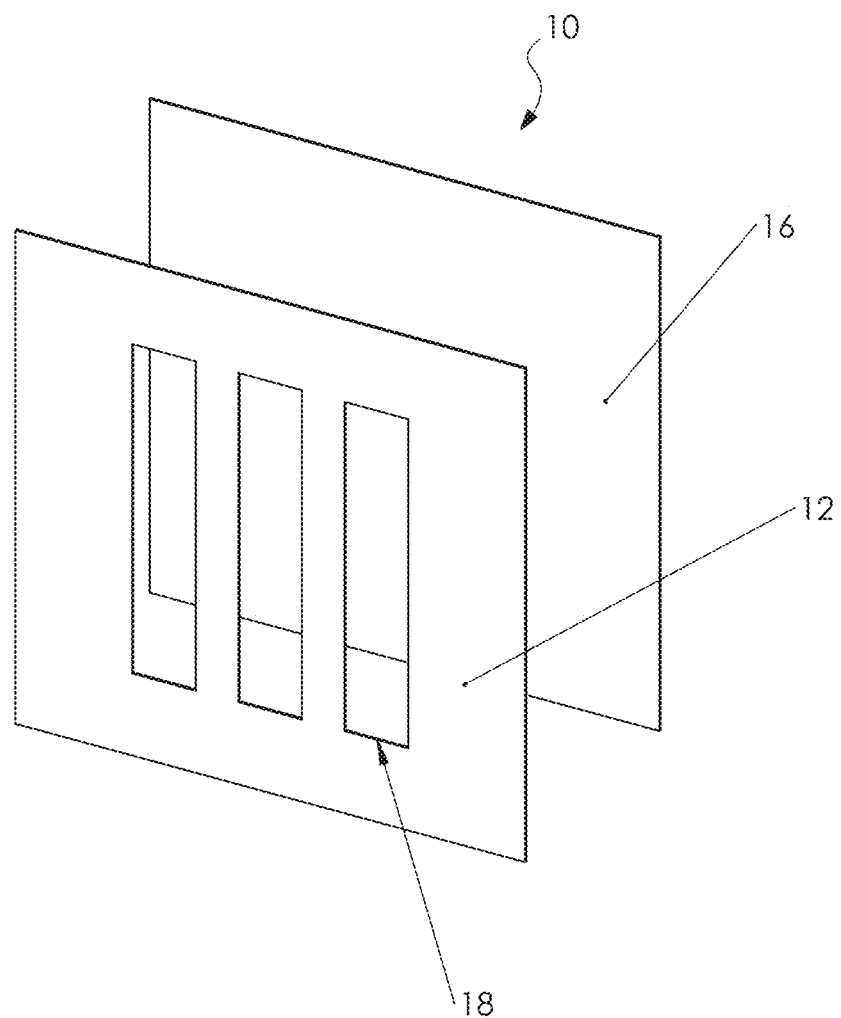
FIG. 7 is a drawing which illustrates a perspective view of a marker with a front panel having multiple openings disposed therein.
Figure 8:
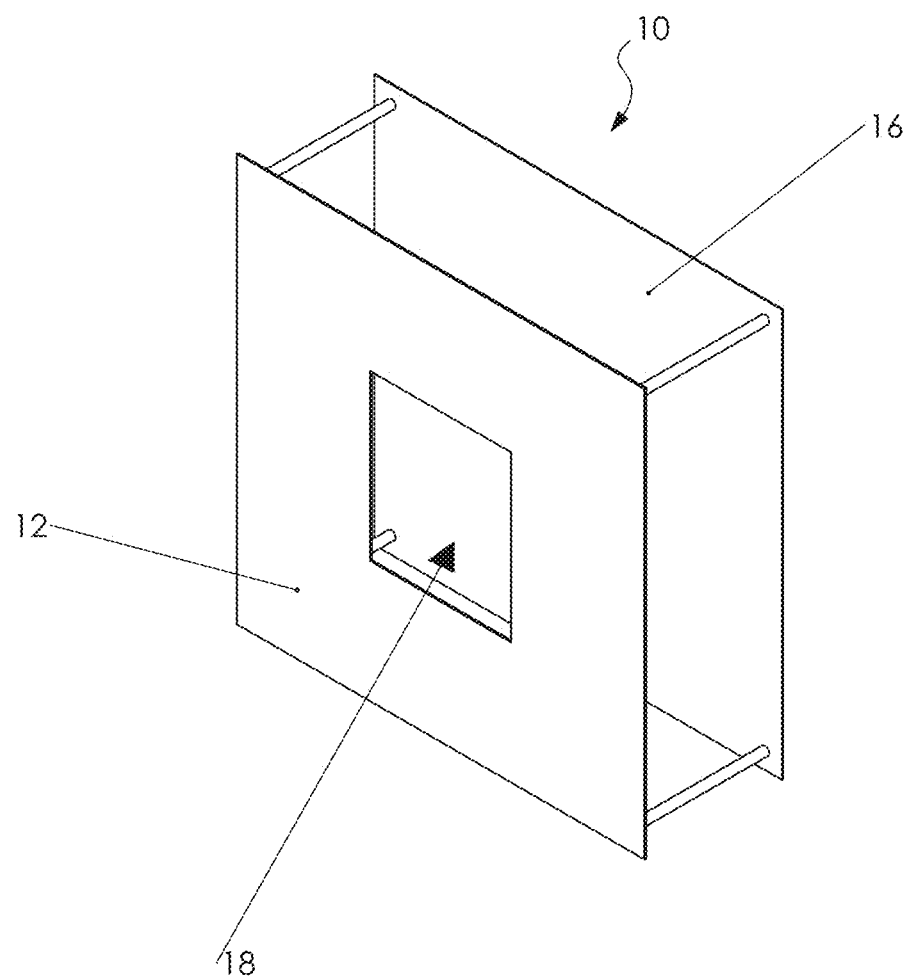
FIG. 8 is a drawing which illustrates a perspective view of a marker with no side panels.
Figure 9:
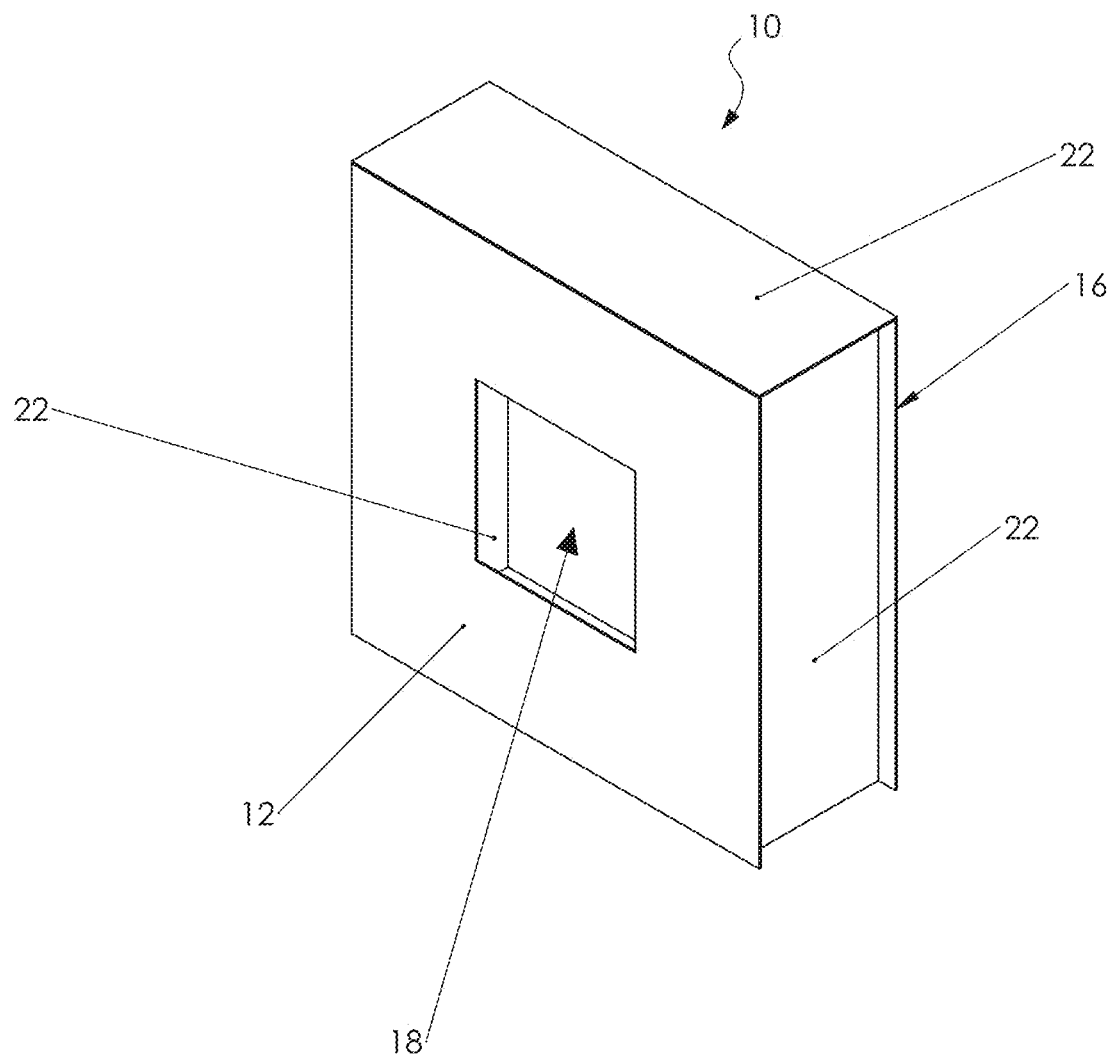
FIG. 9 is a drawing which illustrates a perspective view of a marker with three side panels.

Front panel 12, rear panel 16, and/or any intervening panels 20 can be formed from any material which is capable of at least partially reflecting a signal. In one embodiment, opening 18 is not provided (see FIG. 5). In this embodiment, front panel 12 is preferably smaller than rear panel 16 and/or front panel 12, or a portion thereof, can be formed from or otherwise comprises a portion that is, partially RF transparent so that some signal goes through the front panel and waves are reflected off both panels and internal reflections, which occur between the back of the front panel and the front of the rear panel can also be generated and thus returned as part of the signature.

By having front panel 12 spaced a distance 14 in front of rear panel 16, return signature 32 can result in transceiver 34 detecting a first peak power level representing front panel 12 and a subsequent peak power level representing rear panel 16.

Optionally, processor 35 can use a detection threshold to delineate actual signatures 32 from markers 10 vs background noise or returns from non-marker objects.

Figure 14:
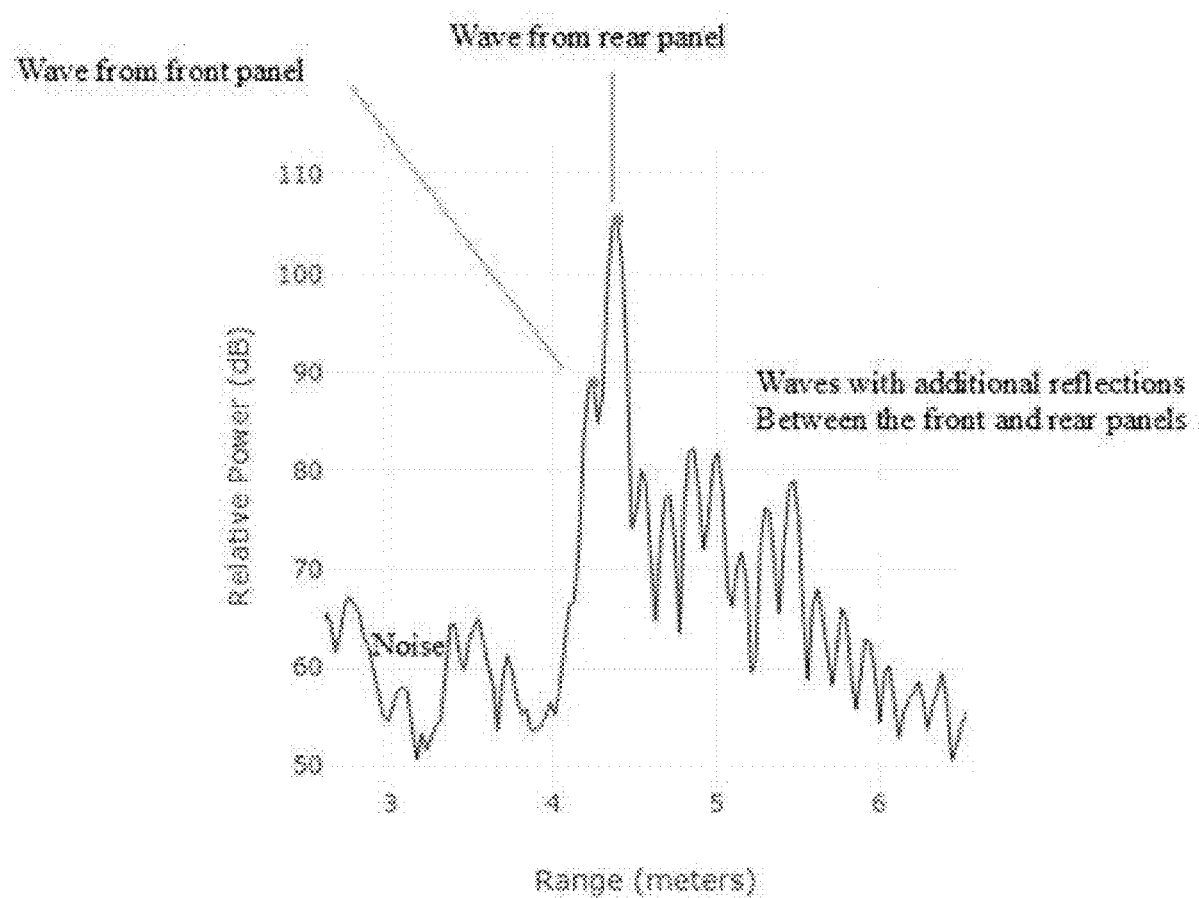
FIG. 14 is a drawing which illustrates a unique signature containing internal reflections of a marker according to an embodiment of the present invention.

FIG. 14 illustrates an example of signature 32 that can be returned from marker 10, which includes the return portion caused by the unique internal reflections that can occur when marker 10 has an area configured to provide internal reflections.

Figure 16:
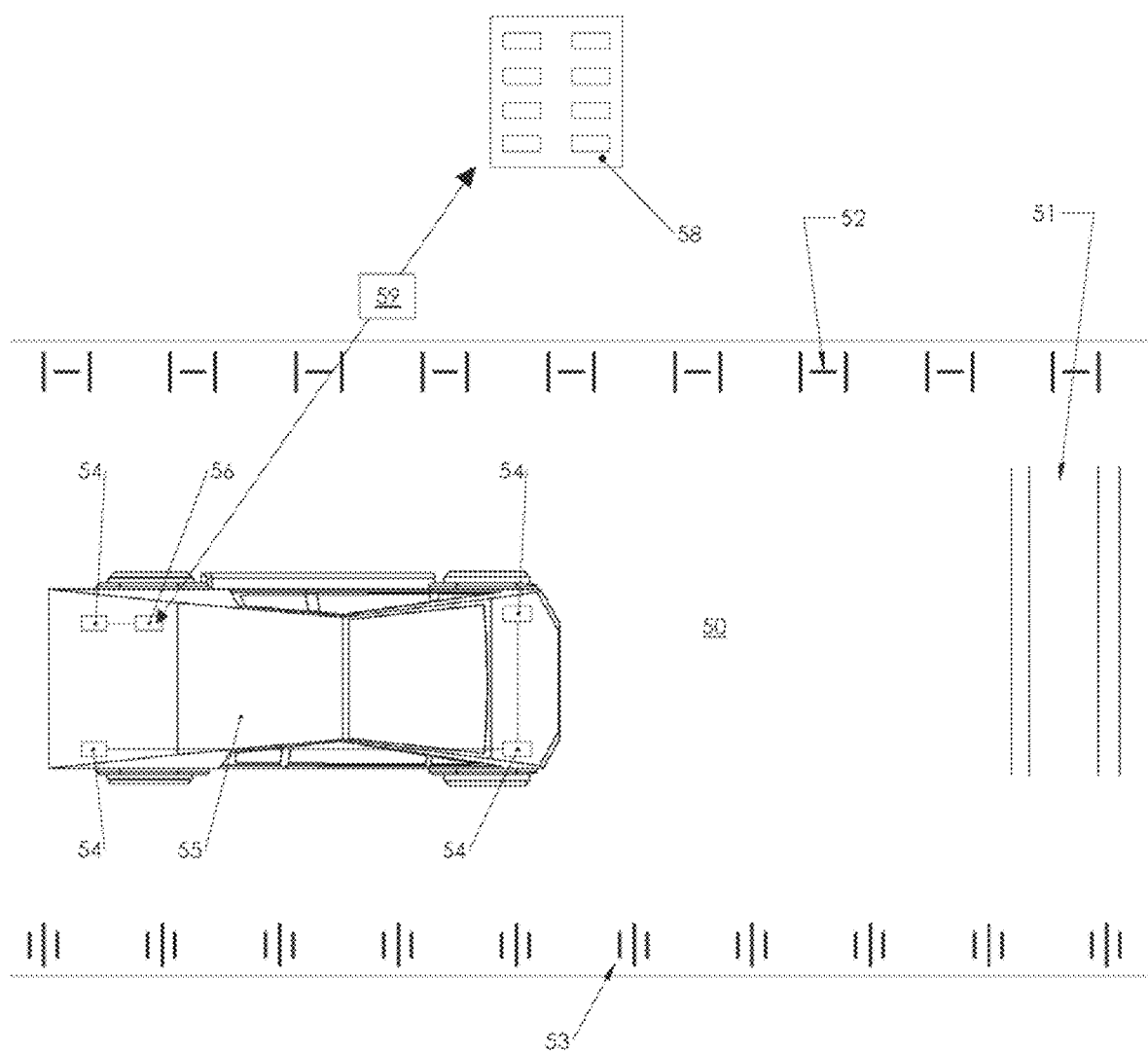
FIG. 16 is a drawing which illustrates an embodiment of the present invention wherein a vehicle can gather information about its surroundings from a plurality of pavement markings.

As best illustrated in FIG. 16 road 50 can be marked with a plurality of patterns which are preferably formed on a portion of road 50, optionally, for example, in a manner similar to rumble strips. However, in this embodiment, an almost infinite number of patterns can be formed and can represent different things. For example, first pattern 51 can be disposed across a road 50—most preferably at a predetermined distance from an intersection. Second pattern 52 can be disposed between lanes on road 50. Third pattern 53 can be disposed along a right side of road 50. Although three patterns are illustrated in FIG. 16, any number of patterns and/or shapes and configurations can optionally be provided and can be placed at predetermined locations along a road or can be used to mark features of the road or the surroundings. Thus, as one example, varying patterns can allow the vehicle to determine whether it is riding on the white line between lanes one and two vs riding on the line between lane one and the right shoulder. By having confirmation that the vehicle is not in the center of its lane and that it absolutely knows which way to move to go to the safer position, the roadways are made safer.

Patterns can be formed on road 50 via any desirable manner such that they cause vibration, movement, and/or sound to be induced or created when a tire of a vehicle rolls over them. For example, patterns can be formed by one or more of cutting, grinding, and/or stamping grooves, shapes or other patterns into road 50 (for example when the concrete is wet and/or asphalt is hot) and/or depositing material, imbedding material, attaching material and/or structures onto road 50. In one embodiment, patterns are preferably disposed or otherwise formed in a road when the road is being formed. Optionally, heated shapes can be pressed into asphalt to form patterns.

In this embodiment, sensor 54 mounted on vehicle 55 is provided and can detect patterns—for example, sensor 54 can be an accelerometer speaker or other device which is capable of detecting the vibrations, movements, and/or sounds that are created when a tire of a vehicle passes over a pattern. Most preferably, sensor 54 is coupled to processor 56, which itself can include a microprocessor and/or microcontroller which is capable of generating unique indicia in response to a detected pattern. Thus, after detecting a pattern, processor 56 preferably references database 58 to retrieve data that has been assigned to each unique pattern. Thus, when a tire of vehicle 55 passes over a pattern, database 58 preferably provides an indication of the meaning of that pattern. Optionally, such patterns can be disposed at precise geographic locations such that as the vehicle passes over that precise geographic location, the navigation system of vehicle 55 is updated or otherwise checked to confirm, note, and/or cross-reference the precise location of vehicle 55. While database 58 can optionally be disposed remote from vehicle 55, for example, database 58 can be stored on the cloud and accessed via a wireless internet or cellular data connection, in one embodiment, database 58 can be stored onboard vehicle 55. Optionally, such onboard database 58 can be routinely and/or periodically updated via a remote master database or via another updating function. For embodiments wherein database 58 is remote from vehicle 55, communication system 59 can be provided to facilitate communication between vehicle 55 and database 58. And, communication system 59 can optionally be provided for embodiments wherein database 58 is stored on vehicle 55 such that communication system 59 can communicate with a remote master database or some other external information source to provide updating capability to database 58.

Although a single sensor 54 can be provided on vehicle 55, optionally, a plurality of sensors 54 can be provided on a single vehicle. For example, in one embodiment, each tire of vehicle 55 can be communicably coupled to a different sensor such that each tire sends data via a separate sensor.

This embodiment can be used independently or in conjunction with the embodiments of FIGS. 1-13. For example, vehicle 55 and vehicle can be one-in-the-same and thus vehicle 55 can have not only sensor 54 but also transceiver 34. Thus markers 10 can be disposed along one or more sides of a road, which itself can include one or more patterns formed or disposed thereon. In such embodiments, while database 30 can be separate from database 58, optionally, they can be combined into a single database.

Embodiments of the present invention provide desirable results for autonomous and semi-autonomous vehicles. Thus, the term "autonomous" as used throughout this application is intended to include not only fully autonomous but also partially autonomous and/or semi-autonomous vehicles and/or any vehicle meeting any of the society of automotive engineers ("SAE") levels 0-5 for automated driving, which can include one or more of:

Level 0: A fully manual vehicle (which itself can include embodiments of the present invention wherein a system is configured provide data to a person who is operating a vehicle);

Level 1: A single automated aspect . . . ;

Level 2: Automated steering and acceleration capabilities . . . ;

Level 3: Environment detection . . . ;

Level 4: No human interaction required . . . ; and/or

Level 5: Human driving is completely eliminated.

Note that in the specification and claims, "about" or "approximately" means within twenty percent (20%) of the numerical amount cited.

Embodiments of the present invention can include every combination of features that are disclosed herein independently from each other. Although the invention has been described in detail with particular reference to the disclosed embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and/or reconfiguring their relationships with one another.

What is claimed is:

1. An autonomous vehicle marker comprising:
   a front panel, said front panel formed from a material that is at least partially RF reflective;
   a rear panel, said rear panel spaced a predetermined distance behind said front panel; and
   said autonomous vehicle marker configured to provide a return signature comprising at least a first RF reflection component and a second RF reflection component such that at least one of the first RF reflection component or the second RF reflection component comprises an internal RF reflection between at least a back of said front panel and a front of said rear panel.

2. The autonomous vehicle marker of claim 1 wherein said front panel comprises at least one opening disposed therein.

3. The autonomous vehicle marker of claim 1 wherein said rear panel is larger than said front panel.

4. The autonomous vehicle marker of claim 1 further comprising at least one side panel.

5. The autonomous vehicle marker of claim 1 wherein said rear panel is formed from a material that reflects RF waves.

6. The autonomous vehicle marker of claim 1 wherein at least one said front panel or said rear panel is formed from a metal material.

7. The autonomous vehicle marker of claim 1 further comprising at least one intervening panel disposed between said front panel and said rear panel.

8. The autonomous vehicle marker of claim 1 wherein said autonomous vehicle marker is configured to return a unique RF signature based on factors of its construction.

9. The autonomous vehicle marker of claim 1 wherein said autonomous vehicle marker is configured to return a unique RF signature based on is physical attributes.

10. The autonomous vehicle marker of claim 1 wherein said physical attributes comprise attributes which impart or alter internal reflections of an RF wave within said autonomous vehicle marker.

11. The autonomous vehicle marker of claim 1 further comprising one or more structures which at least partially reflect RF waves.

12. The autonomous vehicle marker of claim 11 wherein said one or more structures comprise one or more cylindrical structures.

13. The autonomous vehicle marker of claim 1 wherein said front panel comprises a curved shape.

14. The autonomous vehicle marker of claim 13 herein said curved shape comprises a convex shape.

15. The autonomous vehicle marker of claim 1 further comprising a cover disposed over at least a portion of said marker.

16. The autonomous vehicle marker of claim 1 further comprising advertising displayed on said cover.

* * * * *

UNITED STATES PATENT AND TRADEMARK OFFICE
CERTIFICATE OF CORRECTION

PATENT NO. : 11,334,089 B1
APPLICATION NO. : 16/939859
DATED : May 17, 2022
INVENTOR(S) : Jeffrey W. Bryce It is certified that error appears in the above-identified patent and that said Letters Patent is hereby corrected as shown below:

In the Claims

Column 14, Line 37, cancel the text beginning with "9. The autononomous vehicle marker of claim 1" to and ending with "physical attritubes." in Line 39, and insert the following claim:
--9. The autonomous vehicle marker of claim 1 wherein said autonomous vehicle marker is configured to return a unique RF signature based on its physical attributes.--

Column 14, Line 52, cancel the text beginning with "14. The autonomous vehicle marker of claim 13" to and ending with "a convex shape." in Line 53, and insert the following claim:
--14. The autonomous vehicle marker of claim 13 wherein said curved shape comprises a convex shape.--

Signed and Sealed this
Thirtieth Day of August, 2022

Katherine Kelly Vidal
*Director of the United States Patent and Trademark Office*